April 5, 1955  E. A. HENRY  2,705,422

ULTRASONIC INSPECTION DEVICE

Filed March 30, 1951

INVENTOR.
ELLIOTT A. HENRY
BY
Joseph H. Lipschutz
ATTORNEY.

United States Patent Office 2,705,422
Patented Apr. 5, 1955

2,705,422

ULTRASONIC INSPECTION DEVICE

Elliott A. Henry, Bridgeport, Conn., assignor to Sperry Products, Inc., Danbury, Conn., a corporation of New York Application March 30, 1951, Serial No. 218,489

3 Claims. (Cl. 73—67)

This invention relates to the ultrasonic inspection of objects by transmitting ultrasonic waves into the object and receiving reflections from a reflecting surface, such as a defect, within the object. Heretofore various methods for accomplishing the foregoing result have been proposed. One such method is disclosed in the patent to Rassweiler and Erwin No. 2,431,234 granted November 18, 1947, in which a stationary crystal transmits into the object a varying frequency signal to set up a varying standing wave. When the standing wave pattern was such that the distance from the crystal to a reflecting surface within the object equaled ½ wave length, a resonant state was established and such resonance when properly indicated represented the presence of an internal defect. The necessity for varying the frequency of the transmitted signal to vary the standing wave pattern resulted in a complicated instrument that was also difficult to operate. Furthermore it required considerable time to inspect a given area of object due to the fact that the crystal had to be moved to successive stationary positions and in each position the frequency of the transmitted signal had to be varied through a given range.

It is therefore one of the principal objects of this invention to provide an ultrasonic inspection device which will be relatively simple in construction and which will permit rapid scanning of an area of object. For this purpose there is employed a fixed frequency signal, instead of a continuously varying frequency signal as heretofore employed, and the changing standing wave pattern is obtained by moving the crystal relative to the internal defect. The changing standing wave pattern will reflect the transmitted beam and will result in a plurality of successive resonant points at the surface which will be intercepted by the moving crystal. The rate of interception of resonant points by the moving crystal may lie within a clearly audible range and may be indicated by any suitable responsive indicator, either aural or visual.

Further objects and advantages of this invention will become apparent in the following detailed description thereof.

In the accompanying drawings.

Figure 1:
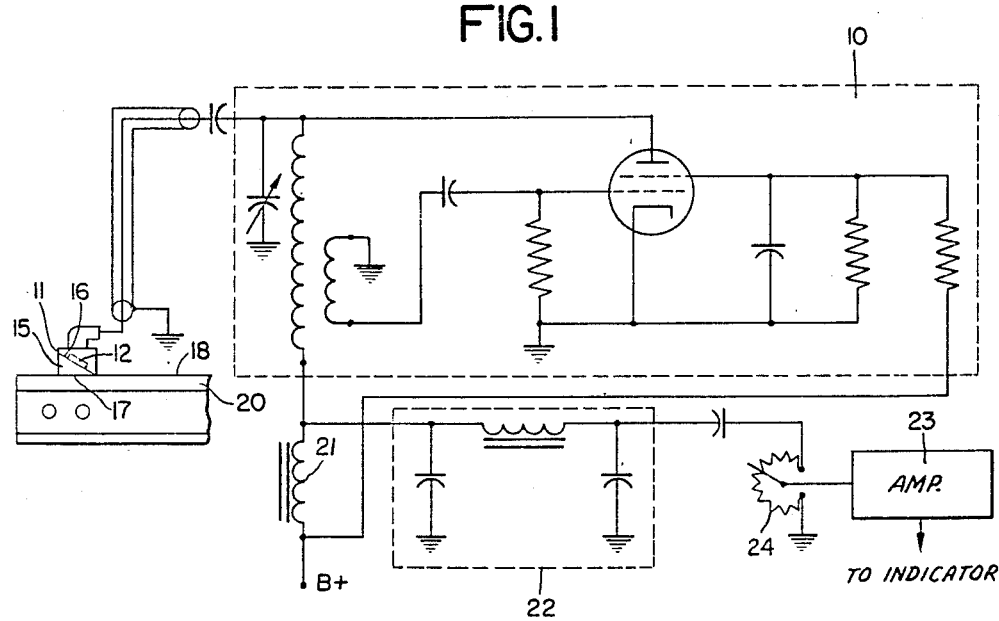
Fig. 1 is a wiring diagram embodying one form of this invention.
Figure 2:
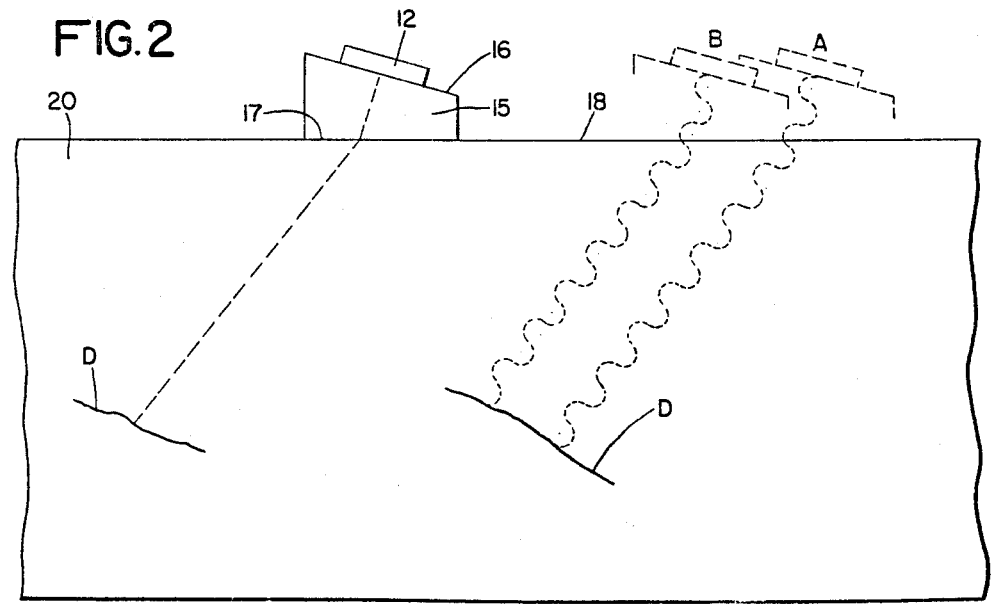
Fig. 2 is a view, largely diagrammatic, illustrating the theory of the invention.

Referring to the drawings, I have shown my invention applied to the inspection of an object which for the purposes of illustration is a rail, but it will be understood that the principle is applicable to the inspection of other objects. The rail is to be inspected for the presence of discontinuities or other internal defects. Heretofore, as stated in the introduction hereto, the practice has been to place a transducer in a stationary position on the rail surface and transmit a varying frequency into the object to set up a varying standing wave pattern. The theory of such operation was that when a frequency was reached whose ½ wave length or multiple thereof equaled the distance from the transducer to the discontinuity, a resonant condition (fundamental or harmonic) would exist, and such resonance could be detected by a suitable responsive mechanism (here shown as a superregenerative receiver 10). The transducer would be moved to successive position along the object, and in each position the range of frequency variation would be passed through. This necessarily resulted in slow operation since it took considerable time to scan an area of object. Furthermore the mechanism for effecting the frequency variation was relatively complicated.

With my device relative simplicity of mechanism as well as more rapid scanning is achieved. To accomplish these results I transmit into the object a fixed frequency signal, instead of running through a range of varying frequencies. For this purpose I have shown an oscillator, preferably of the superregenerative type, indicated generally at 10, designed to generate electrical oscillations of a fixed frequency. These oscillations are applied to a transducer 11 which transforms the electrical oscillations into mechanical oscillations. The transducer may comprise a piezo-electric element in the form of a quartz crystal 12 mounted on a vibration transmitting support 15 adapted to engage the object 20 to be inspected. The surface 16 of support 15 with which the crystal engages is preferably inclined at an angle with respect to the base 17 which engages the surface 18 of object 20, so that the beam will be transmitted into the object at a desired angle. The fixed frequency beam which is transmitted into the object will be reflected by any internal reflecting surface such as a fissure D back to the transmitting crystal.

As stated in the introduction hereto, prior methods have set up a variable standing wave, and when a frequency was reached such that the distance from the crystal to the defect was a multiple of ½ wave length a resonant point would be reached and when indicated would denote the presence of a fissure. By my method I generate a fixed frequency signal and obtain the variable standing wave by moving the crystal relative to the defect. It will be seen that as the crystal moves from position A to position B, the standing wave pattern is changing continuously and if at A the distance from the crystal to the discontinuity is a multiple of ½ wave length, then at some point further along in the movement of the crystal, as for instance in position B, there will again occur the condition wherein the distance from the crystal to the discontinuity is a multiple of ½ wave length of the transmitted signal. It will be understood that in moving the distance from A to B there will be a substantial number of resonant points, i. e., a substantial number of positions in which the distance from the crystal to the discontinuity is a multiple of ½ wave length. Therefore as the crystal is moved along the surface 18 of object 20, if there is present a discontinuity such as fissure D, such discontinuity will become evident by the interception of resonant points by the crystal, and the tone generated (in case of a frequency responsive indicator) will be a function of the rate of interception. Since the rate of generation of such resonant points, and therefore the rate of interception of such resonant points by the crystal 11 when related to the rate of movement of the crystal is in the audible range, the presence of such defect can be indicated by any suitable audio responsive mechanism.

To obtain a signal in the audio frequency range in response to the presence of a defect it is necessary to separate such signal from the radio frequency waves generated by receiver 10 and applied to the crystal. For this purpose the signal returned by the crystal is applied to the choke coil 21 which is a load impedance in the plate circuit of the receiver 10. The signal is then applied to a low-pass filter 22 which will pass the low frequency component in the audible range and will reject the radio frequency as well as the quench frequency caused by the starting and stopping of the oscillator tube. The filter also serves to stretch the low frequency pulses.

The audible frequency pulses passed by filter 22 are amplified by amplifier 23 whose output may be caused to actuate any audio frequency responsive indicating mechanism. A volume control in the form of a potentiometer 24 may be provided for amplifier 23.

Having described my invention, what I claim and desire to secure by Letters Patent is:

1. An apparatus for the ultrasonic inspection of objects, comprising means for generating an ultrasonic wave of fixed frequency, means connected to the generating means for transmitting the ultrasonic wave into the object along an axis inclined with respect to the normal to the surface of the object, said transmitting means comprising an electro-acoustic transducer moved along the surface of the object, whereby a standing wave pattern will be set up within the object when said beam strikes a reflecting surface within the object and the distance between the transducer and the reflecting surface in the object is varied to vary the standing wave pattern, said transducer in its movement intercepting points of harmonic resonance, means connected to the generating means whereby the resonance points intercepted by said transducer are detected, and means connected to the preceding means for indicating successive resonance points intercepted throughout the length of the reflecting surface.

2. An apparatus for the ultrasonic inspection of objects as specified in claim 1, in which said generating means and said means connected to the generating means whereby the resonance points intercepted by said transducer are detected comprise a superregenerative circuit.

3. An apparatus for the ultrasonic inspection of objects as specified in claim 1, in wthich the means connected to the generating means whereby the resonance points intercepted by said transducer are detected includes filtering means for passing only low frequency waves.

References Cited in the file of this patent

UNITED STATES PATENTS

| | | |
|---|---|---|
| 2,522,924 | Branson | Sept. 19, 1950 |
| 2,534,006 | De Lano, Jr., et al. | Dec. 12, 1950 |
| 2,550,528 | Carlin | Apr. 24, 1951 |